United States Patent
Hildebrand et al.

(10) Patent No.: US 10,248,678 B2
(45) Date of Patent: Apr. 2, 2019

(54) ENABLING PLACEMENT CONTROL FOR CONSISTENT HASHING-BASED OBJECT STORES

(71) Applicant: INTERNATIONAL BUSINESS MACHINES CORPORATION, Armonk, NY (US)

(72) Inventors: Dean Hildebrand, Bellingham, WA (US); William W. Owen, Tucson, AZ (US); Lukas L. Rupprecht, London (GB); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 14/835,204

(22) Filed: Aug. 25, 2015

(65) Prior Publication Data
US 2017/0060865 A1    Mar. 2, 2017

(51) Int. Cl.
*G06F 17/30* (2006.01)

(52) U.S. Cl.
CPC .................. *G06F 17/3033* (2013.01)

(58) Field of Classification Search
CPC .................................................. G06F 17/3033
See application file for complete search history.

(56) References Cited

U.S. PATENT DOCUMENTS

| | | | |
|---|---|---|---|
| 7,778,984 B2 | 8/2010 | Zhang et al. | |
| 8,478,799 B2 | 7/2013 | Beaverson et al. | |
| 2004/0054807 A1* | 3/2004 | Harvey | H04L 12/56 709/243 |
| 2007/0156842 A1* | 7/2007 | Vermeulen | G06F 17/30212 709/217 |
| 2014/0075519 A1* | 3/2014 | Porras | H04L 63/20 726/4 |
| 2014/0379715 A1 | 12/2014 | Kesselman et al. | |
| 2015/0019574 A1 | 1/2015 | Ishikawa | |
| 2015/0081720 A1 | 3/2015 | Beaverson et al. | |
| 2016/0378846 A1 | 12/2016 | Luse et al. | |

OTHER PUBLICATIONS

OpenStack Swift "http://docs.openstack.org/developer/swift/", 2014.
(Continued)

*Primary Examiner* — Dinku W Gebresenbet
(74) *Attorney, Agent, or Firm* — Patterson + Sheridan, LLP

(57) ABSTRACT

Techniques are disclosed herein for controlling object placement in object storage. A placement component of a storage application receives a request to store a first object in an object store having multiple nodes. The object store determines a placement of the first object to one of the nodes based on an object namespace including a numerical namespace and a lexicographical namespace. Each node is assigned a corresponding subspace of the object namespace for storing objects. The first object includes a numerical namespace value and a lexicographical namespace value. A second object (a replica of the first object) is generated. The first object is stored to a first node based on the lexicographical namespace value. The second object is stored to a second node based on the numerical namespace value.

20 Claims, 7 Drawing Sheets

(56) References Cited

OTHER PUBLICATIONS

Decandia et al., "Dynamo: Amazon's Highly Available Key-value Store" 2007.
Apache Hadoop HDFS "http://hadoop.apache.org/docs/r1.2.1/hdfs_design.html", 2013.
Harvey et al., "SkipNet: A Scalable Overlay Network with Practical Locality Properties", 2003.
Zhou et al., "Location-based node IDs: Enabling Explicit Locality in DHTs", 2003.
Weil et al., "Crush: Controlled, Scalable, Decentralized Placement of Replicated Data", 2006.
OpenStack Swift "http://docs.openstack.org/developer/swift/admin_guide.html", 2014.
Jeff Darcy "http://pl.atyp.us/hekafs.org/index.php/2012/03/glusterfs-algorithms-distribution/", 2012.
Mihailescu et al., "MixApart: Decoupled Analytics for Shared Storage Systems", 2013.
Harter et al., "Analysis of HDFS Under HBase: A Facebook Messages Case Study", 2014.

\* cited by examiner

ENABLING PLACEMENT CONTROL FOR CONSISTENT HASHING-BASED OBJECT STORES

BACKGROUND

Embodiments presented herein generally relate to storage management, and more specifically, to controlling object placement in an object store that uses consistent hashing-based techniques to store objects.

An object store is a data store that maintains an arbitrary number of objects (e.g., text files, audio/visual files, image files, and so on) and metadata associated with each object. Rather than manage data as files or blocks, the object store abstracts storage layers such that the data maintained by the object store can be exposed and managed as objects. Further, an object store can be distributed across multiple clustered storage nodes. Doing so generally provides the object store with scalability, high availability, and low latency.

Determining which node to store a given object is a known issue in managing object stores. One approach for controlling object placement is through consistent hashing. In this approach, the object store maps each node to an identifier using a secure hash function (e.g., SHA-1, MD5, etc.). The hash function is also used to generate a value that can uniquely identify each object. This results in a static mapping between objects and nodes.

The consistent hashing approach provides for uniform distribution of objects across nodes. Further, if nodes are disconnected from the cluster, consistent hashing allows the object store to re-map the objects to different nodes. Thus, attempts to disable the object store via attacks on an individual node are generally ineffective. In addition, consistent hashing allows for decentralized object lookups, which results in relatively fast and scalable object location.

However, consistent hashing limits user and process control over what node stores a given object. That is, because the mapping between objects and nodes is static, users (or processes) are generally unable to specify a location in which to store a given object. As another example, rename operation performance can be adversely affected. Because objects are typically copied when renamed, performing the hash function over the new object may result in the in the object being copied to a different node. As a result, the rename operation can impact performance on latency-sensitive processes (e.g., distributed workloads that perform intensive write and rename operations).

SUMMARY

One embodiment presented herein discloses a method for controlling object placement. The method generally includes receiving a first request to store a first object in an object store which includes a plurality of nodes. The object store determines a placement of the first object in one of the plurality based on an object namespace including a numerical namespace and a lexicographical namespace. Each node is assigned a corresponding subspace of the object namespace for storing objects. The first object includes a numerical namespace value and a lexicographical namespace value. The method also includes generating a second object, which is a replica of the first object. The first object is stored in a first node of the plurality of nodes based on the lexicographical namespace value. The second object is stored in a second node of the plurality of nodes based on the numerical namespace value.

Another embodiment discloses a computer program product that includes a non-transitory computer-readable storage medium having instructions, which, when executed on a processor, performs an operation for controlling object placement. The operation generally includes receiving a first request to store a first object in an object store which includes a plurality of nodes. The object store determines a placement of the first object in one of the plurality based on an object namespace including a numerical namespace and a lexicographical namespace. Each node is assigned a corresponding subspace of the object namespace for storing objects. The first object includes a numerical namespace value and a lexicographical namespace value. The operation also includes generating a second object, which is a replica of the first object. The first object is stored in a first node of the plurality of nodes based on the lexicographical namespace value. The second object is stored in a second node of the plurality of nodes based on the numerical namespace value.

Yet another embodiment presented herein discloses a system having a processor and a memory storing program code, which, when executed on the processor, performs an operation for controlling object placement. The operation generally includes receiving a first request to store a first object in an object store which includes a plurality of nodes. The object store determines a placement of the first object in one of the plurality based on an object namespace including a numerical namespace and a lexicographical namespace. Each node is assigned a corresponding subspace of the object namespace for storing objects. The first object includes a numerical namespace value and a lexicographical namespace value. The operation also includes generating a second object, which is a replica of the first object. The first object is stored in a first node of the plurality of nodes based on the lexicographical namespace value. The second object is stored in a second node of the plurality of nodes based on the numerical namespace value.

DETAILED DESCRIPTION

Figure 1:
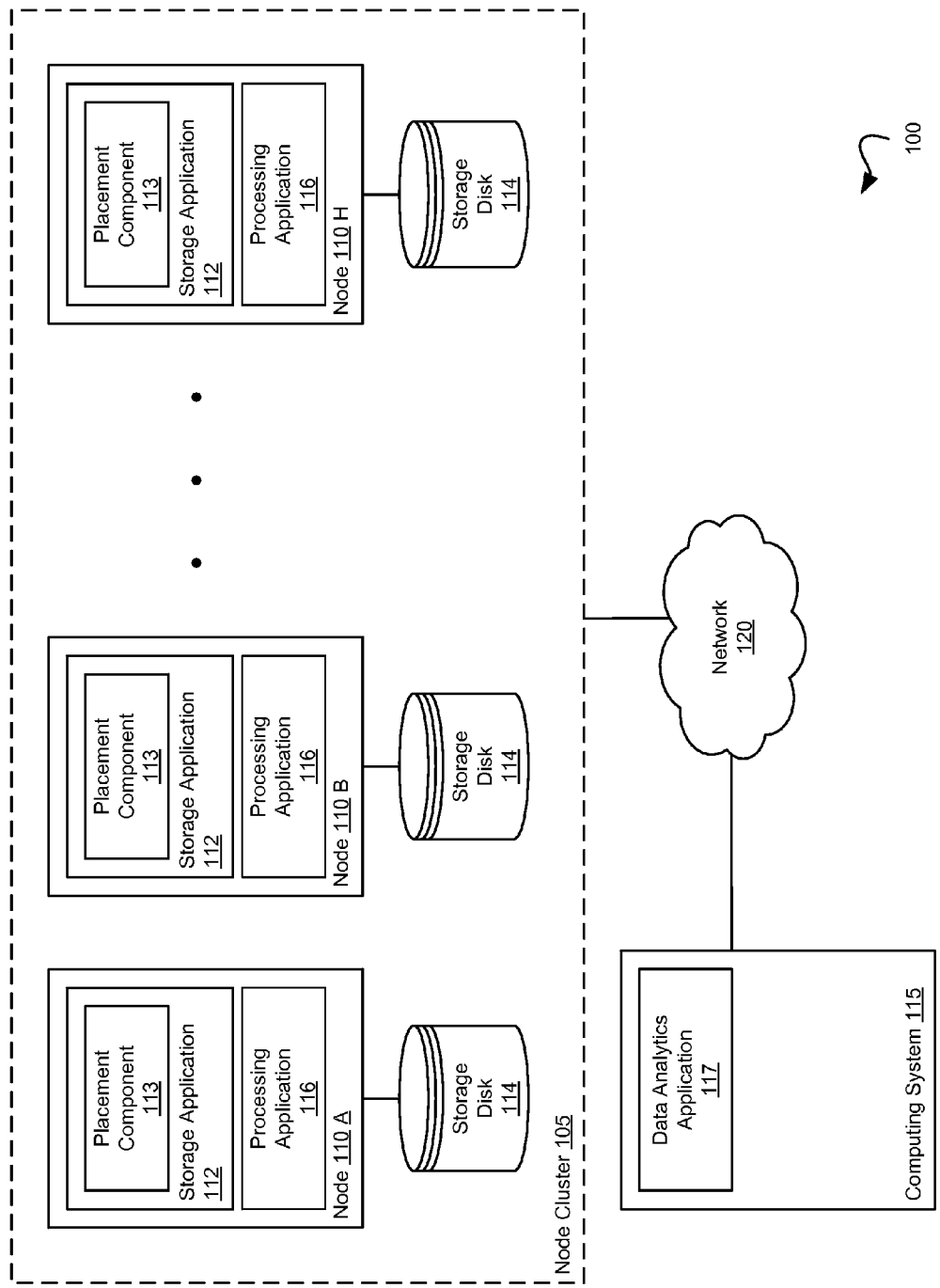
FIG. 1 illustrates an example computing environment, according to one embodiment.

Embodiments presented herein disclose techniques for controlling object placement in a consistent hashing-based object store. More particularly, techniques are disclosed which provide a two-component object namespace for the object store that allows a user (or process) to specify which node to store an object.

In a consistent hashing-based object store, each cluster node of the object store maps to an identifier using a secure hash function (e.g., SHA-1, MD5, etc.). The hash function generates a value that uniquely identifies each object. This results in a static mapping between objects and devices. Further, the object store may replicate an object in different cluster nodes, as needed, to satisfy fault tolerance and availability requirements for the object store. As used herein, the term "primary replica" refers to the original object maintained in the object store.

To address limitations of the consistent hashing-based object store on controlling object placement, current approaches typically provide a two-component object namespace that includes a numerical namespace (NNS) and a lexicographical namespace (LNS). An object name may then be composed of two parts, e.g., a prefix indicating a NNS value and a suffix indicating a LNS value. The object store uses the NNS value to determine a storage node in which to store the object based on the hash of the object name. The LNS value specifies an identifier of a node in which to store the object. However, several limitations to current two-component object namespace approaches exist. For example, users and processes wishing to control object placement need to know an exact name of the object to locate the object. Because nodes are able to change the object names automatically (e.g., when executing certain jobs that access the object), subsequently locating the object becomes difficult, and thus, system usability is affected.

To address such issues, in one embodiment, the object store determines where to store replicas based on the NNS and LNS values of the object. For instance, if a given object name specifies an LNS value, then the object store places a replica of the object (hereinafter, a "location-aware" replica) in the storage node indicated by the LNS value. In addition, any other replicas of that object are stored based on the NNS value, i.e., the resulting hash value, of the object. For example, assume a process places object "A" in the object store. In this case, the object store performs a hash function over "A" to determine a node placement. As another example, assume that the process places object "A#host1" in the object store, where the '#' character acts as a separator between the NNS prefix and the LNS suffix. In this case, the object store places the object directly in the node corresponding to the "host1" identifier. Additional replicas of "A#host1" may be stored based on the NNS prefix A, i.e., based on the resulting hash value of object A. Advantageously, a user or process does not need to know an LNS value of the object to locate the object as a result (while still allowing authorized users and processes to control placement of objects via the LNS value).

Further, to prevent attacks from malicious actors, the object store may allow only authorized users (and processes) to determine object placement using LNS values. In one embodiment, storage nodes may use role-based authentication to determine whether a given process has sufficient privileges to assign an LNS value with a given object. For example, the object store may restrict LNS values to be used by administrators and rename-intensive workloads. Doing so prevents unauthorized users and processes from controlling object placement.

FIG. 1 illustrates an example computing environment 100, according to one embodiment. As shown, the computing environment 100 includes a node cluster 110, a computing system 115, and a network 120. In one embodiment, the network 120 is the Internet.

The node cluster 105 provides a distributed computing environment which includes nodes 110 A-H. Each node 110 may be a physical computing system or a virtual machine instance in the cloud. Each node further includes a storage application 112, a processing application 116, and a storage disk 114. The storage application 112 further includes a placement component 113. The storage application 112 manages objects placed in any of the storage disks 114. The processing application 116 manipulates large blocks of data (e.g., sent by a data analytics application 117 executing on the computing system 115). For example, the processing application 116 allocates workload tasks for the data to each of the nodes 110. In turn, the nodes 110 perform the tasks and may store intermediate and complete results (via the storage application 112) to the storage disk 114.

In one embodiment, the storage application 112 abstracts storage layers in the storage disk 114 such that data is exposed and managed as objects. The storage disk 114 serves as an object store that maintains a number of arbitrary objects (e.g., text files, audio files, video files, and so on) and metadata associated with each object. In one embodiment, the placement component 113 controls where a given object is stored in the node cluster 105. As described below, the placement component 113 may use consistent hashing techniques to store, retrieve, and manage objects. For example, tasks performed by the processing application 116 may require that objects be retrieved, copied, renamed, etc. As a result of such operations objects being placed in different nodes. In some cases, however, it may be desirable for the processing application 116 to control where objects are placed.

In one embodiment, the storage application 114 replicates objects based on a storage policy. The storage policy may determine how many replicas to create for a corresponding object, e.g., to satisfy storage requirements, fault tolerance and availability requirements, etc. Replicas are stored on storage disks 114 of different nodes 110.

Figure 2:
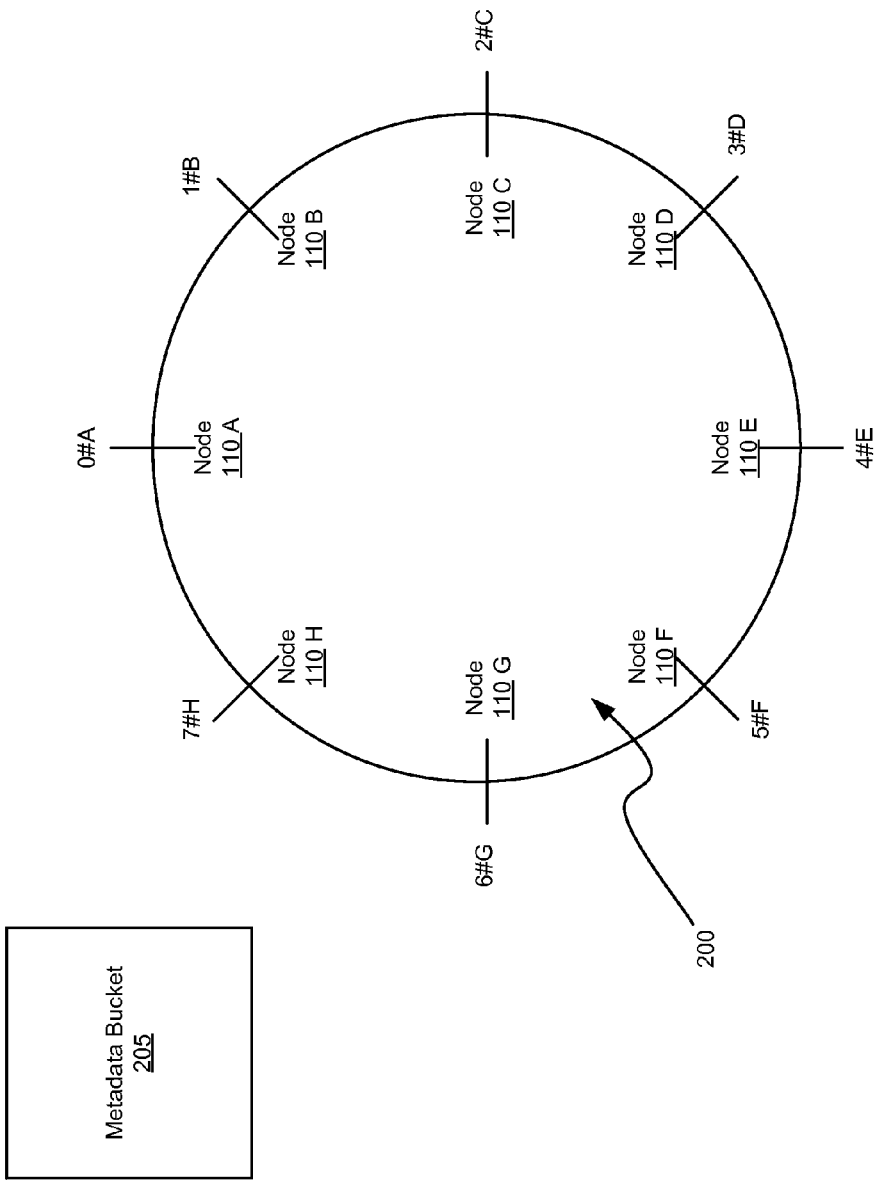
FIG. 2 illustrates an abstraction of a consistent-hashing approach to determining object placement in an object store, according to one embodiment.

FIG. 2 illustrates an abstraction of a consistent hashing approach for determining object placement in an object store, according to one embodiment. In particular, FIG. 2 depicts the nodes 110 distributed clockwise across a consistent hashing ring 200, from Node 110 A-Node 110 H. Further, each node A-H 110 is numbered from 0 to 7, respectively. The numbers are used to lookup which node stores a given object. In addition, each node 110 A-H include a letter designation next to the assigned number, separated by a '#' character. As will be further described below, the lettering indicates a lexicographical identifier for a respective node.

Further, in one embodiment, a container 205 stores metadata information describing each object stored in one of the nodes 110. Although represented as a single container, the object store can have multiple containers 205 that groups different objects together. The metadata container 205 may specify process-specific information related to each object. The metadata container 205 may also specify grouping information for an object stored in that container 205.

Typically, the placement component 113 performs a secure hash function (e.g., SHA-1, MD5, etc.) over an identifier of the object to determine in which of the nodes 110 to store an object. The placement component 113 uses a full range of hash values produced by the hash function, essentially forming a ring. The result of the hash function over the object identifier indicates which node 110 to use to store the object. The placement component 113 can similarly identify the location (for retrieval, deletion, renaming, etc.) using the hash function process.

In one embodiment, in addition to location based on a secure hash function, the placement component 113 also locates a stored object based on the lexicographical identifier. To provide such support, the object store provides an object namespace that allows location based on both a result of a secure hash function and based on lexicographic identifier.

Figure 3:
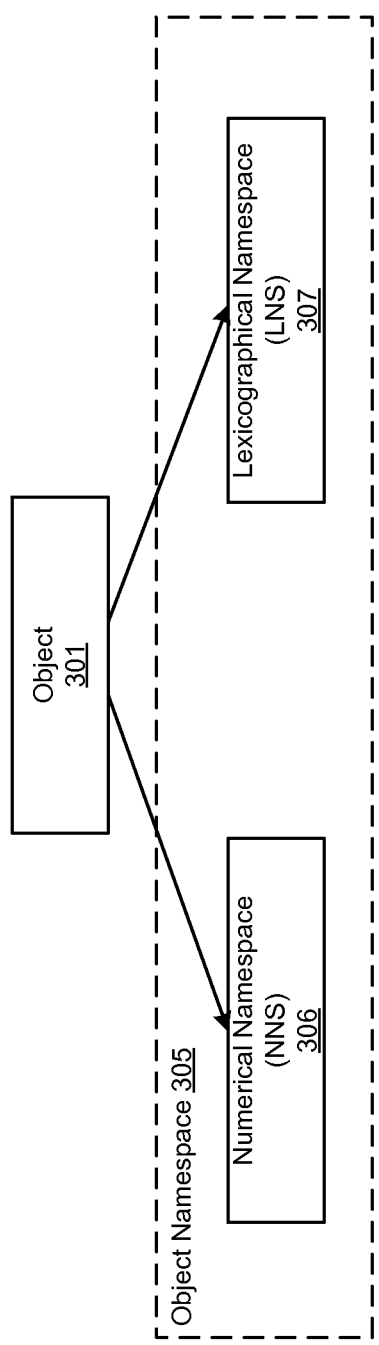
FIG. 3 illustrates an abstraction of an object namespace, according to one embodiment.

FIG. 3 illustrates an abstraction of an object namespace 305, according to one embodiment. Illustratively, an object 301 can be identified based on two parts of the object namespace 305: a numerical namespace (NNS) 306 and a lexicographical namespace (LNS) 307. As a result, a name of the object 301 may include an NNS 306 value and an LNS 307 value that can be separated by a character (e.g., a '#'). In one embodiment, the NNS 306 value allows the placement component 113 to identify an object location based on the hash of the identifier. In one embodiment, the LNS 307 value corresponds to the lexicographic identifier of the node. For example, given an object o#B, the NNS 306 value is the hash result of the identifier of object o, and the LNS 307 value is B (or node 110 B).

In one embodiment, the placement component 113 determines where to store the object based on a presence of an LNS 307 value for a given object. Objects having an associated LNS 307 value are referred to herein as a "location-aware replica." In the event that the object has only an NNS 306 value (and no LNS 307 value associated), then the placement component 113 determines to store the object based on a hash value of the object identifier. Otherwise, the placement component 113 stores location-aware replicas based on the associated LNS 307 value. Continuing the previous example of object o#B, the placement component 113 identifies the storage location for o#B to be node 110 B, based on the LNS 307 value of B.

The placement component 113 stores additional replicas associated with the location-aware replica based on the NNS 306 value of the object. As a result, an authorized user or process may control placement of the primary replica of an object to a given node without disrupting operations to other replicas of the object in the object store. Further, the user or process may remain location-agnostic when performing a desired operation to an object maintained in the object store. For example, if a location-aware replica exists in the object store, a process does not need to know the LNS 307 value associated with the replica. In such a case, the process may still retrieve the object based on the NNS 306 value. Note, however, that in the event that a location-aware replica is accessed, standard storage operations, such as insert (PUT) operations, retrieve (GET) operations, and delete (DELETE) operations are modified to account for the object namespace 305.

Figure 4:
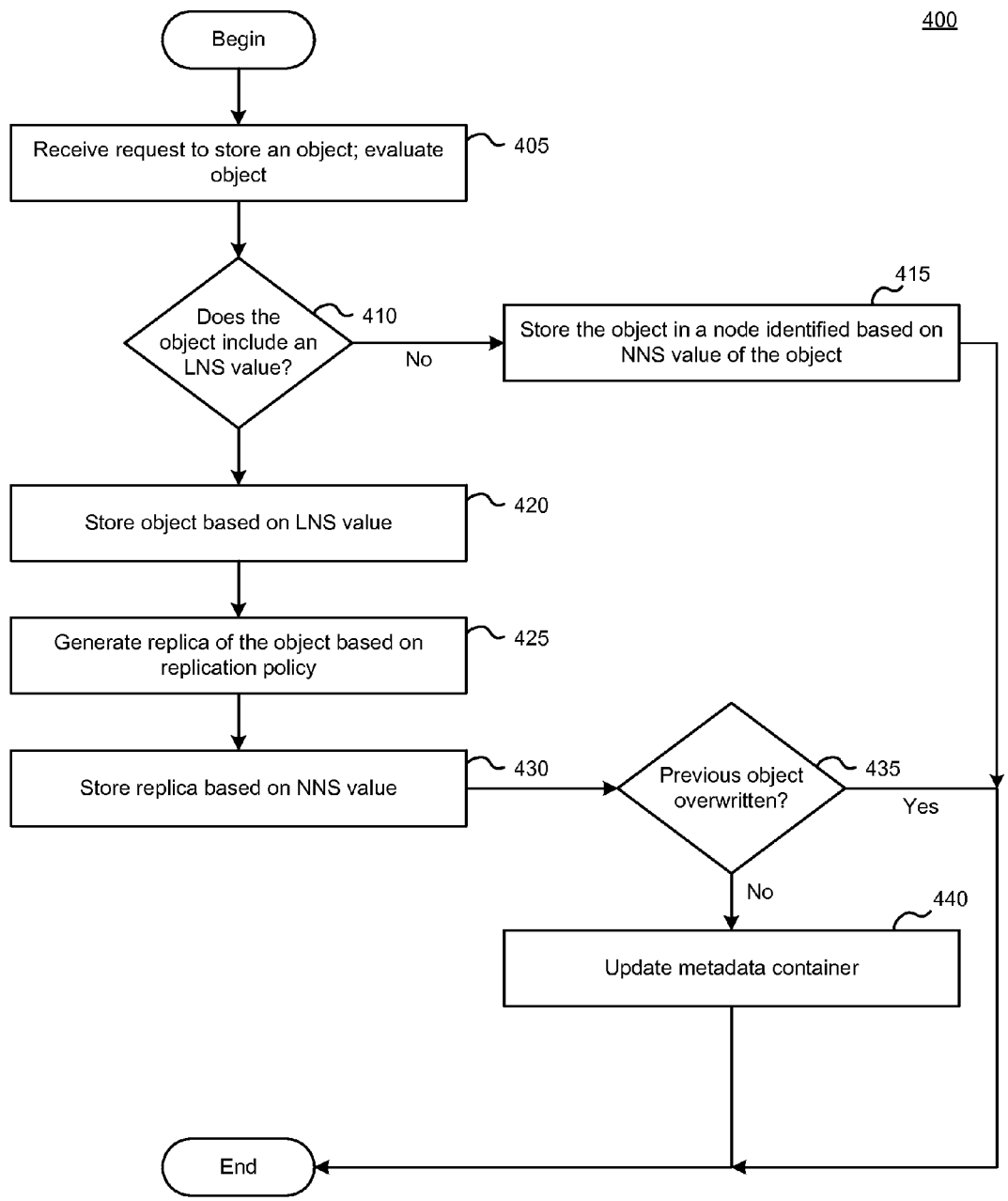
FIG. 4 illustrates a method for placing an object into an object store, according to one embodiment.

FIG. 4 illustrates a method 400 for placing an object into an object store, according to one embodiment. As shown, method 400 begins at step 405, where the storage application 112 receives a request to store an object. For example, the storage application 112 may receive such a request from an authorized user or process. The placement component 113 then evaluates the object name. At step 410, the placement component 113 determines whether the object name includes an LNS value. The presence of an LNS value indicates that the process (or user) specifies the object to be stored in a given node of the cluster 105.

If the object specified in the request does not include an LNS value, then at step 415, the placement component 113 stores the object in the node identified based on the NNS value of the object, i.e., the result of the hash function on the object identifier. Otherwise, at step 420, the placement component 113 stores the object (as a primary replica) based on the indicated LNS value. At step 425, the storage application 112 generates a secondary replica of the object based on the replication policy. At step 430, the storage application 112 stores the secondary replica based on the NNS value of the object.

At step 435, the placement component 113 determines whether a previous corresponding object is overwritten. If the object specified in the request overwrites an older copy of the object, then the method 400 ends (i.e., the older copy did not include an LNS value or had an identical LNS value). Otherwise, it is possible that the object name did not previously exist or that an object with the same name but located on a different host exists. In either case, the placement component 113 updates the corresponding metadata container 205. To do so, the placement component 113 searches the metadata container 205 for a matching NNS value. Once identified, the placement component 113 updates the metadata container 205 with the object information. Further, the placement component 113 determines whether an object having the same name exists on a different node 110. If so, the placement component 113 deletes the primary replica of that object.

Figure 5:
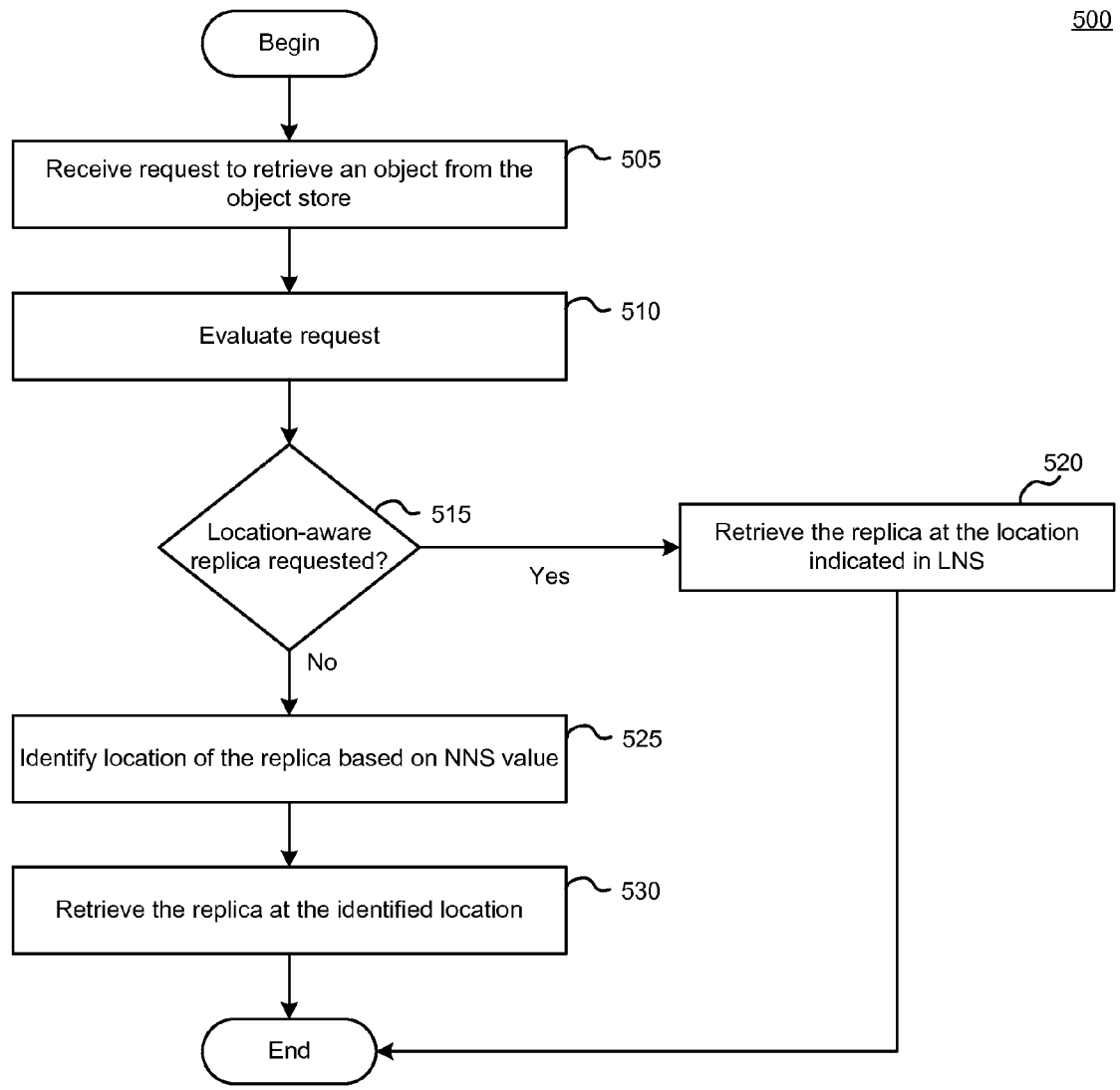
FIG. 5 illustrates a method for retrieving an object from an object store, according to one embodiment.

FIG. 5 illustrates a method 500 for retrieving an object from an object store, according to one embodiment. As shown, method 500 begins at step 505, where the storage application 112 receives a request (e.g., from an authorized user or process) to retrieve an object from the object store. At step 510, the placement component 113 evaluates the request. The placement component 113 does so to determine whether the object specified in the request indicates a location-aware replica (at step 515).

If so, then at step 520, the placement component 113 identifies the location of the location-aware replica based on the LNS value. To do so, the placement component 113 may, in parallel, query the corresponding metadata container and query other replicas of the object to retrieve the full object name. The parallel query minimizes latency used in the additional lookup. The placement component 113 then retrieves the replica at the identified location. Otherwise, at step 525, the placement component 113 identifies the location of the replica based on the NNS value specified in the request. At step 530, the placement component 113 retrieves the replica at the identified location.

Figure 6:
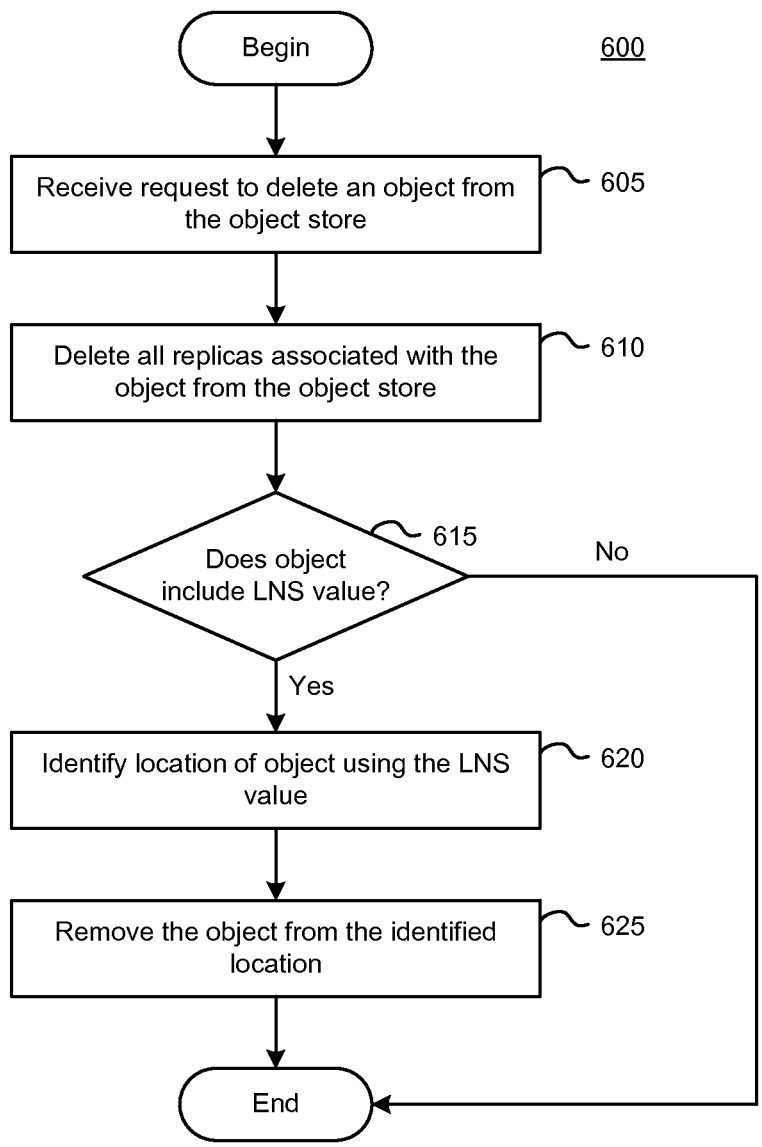
FIG. 6 illustrates a method for deleting an object from an object store, according to one embodiment.

FIG. 6 illustrates a method 600 for deleting an object from an object store, according to one embodiment. As shown, method 600 begins at step 605, where the storage application 112 receives a request to delete an object from the object store. At step 610, the storage application 112 identifies and deletes all replicas associated with the object from the object store.

Further, at step 615, the placement component 113 evaluates the object to determine whether the object includes an associated LNS value. If not, then method 800 ends. Otherwise, at step 620, the placement component 113 identifies the location of the object based on the LNS value. At step 625, the placement component 113 removes the object from the identified location.

Figure 7:
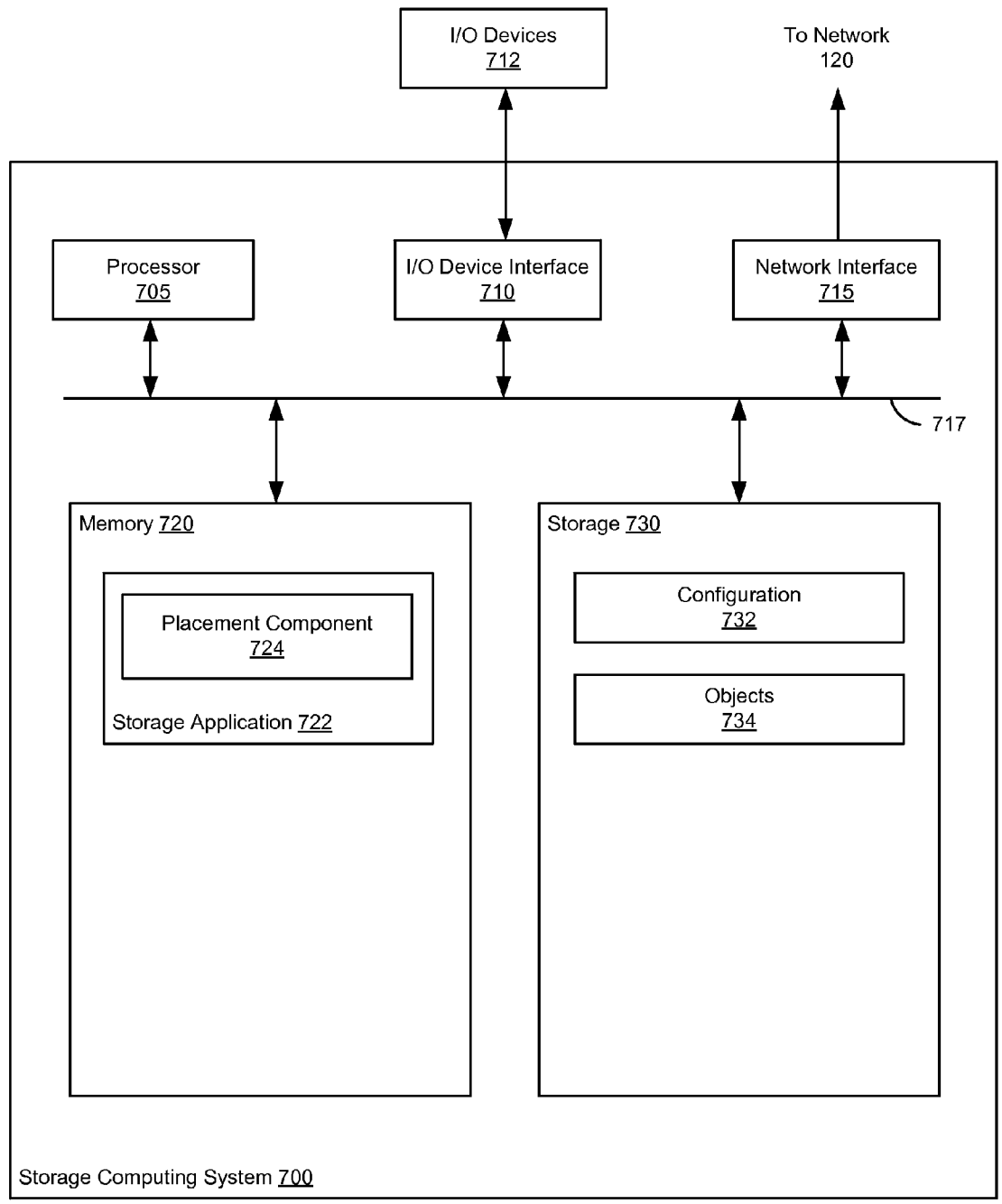
FIG. 7 illustrates an example computing system configured to perform consistent-hashing-based object storage, according to one embodiment.

FIG. 7 illustrates an example storage computing system 700 configured to perform consistent-hashing-based object storage, according to one embodiment. As shown, the storage computing system 700 includes, without limitation, a central processing unit (CPU) 705, a network interface 715, a memory 720, and storage 730, each connected to a bus 717. The storage computing system 700 may also include an I/O device interface 710 connecting I/O devices 712 (e.g., keyboard, display, mouse devices, etc.) to the storage computing system 700. Further, in context of the present disclosure, the computing elements shown in the storage computing system 700 may correspond to a physical computing system (e.g., a system in an enterprise network) or a virtual computing instance.

CPU 705 retrieves and executes programming instructions stored in memory 720 as well as stores and retrieves application data residing in the storage 730. The bus 717 is used to transmit programming instructions and application data between CPU 705, I/O devices interface 710, storage 730, network interface 715, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes a storage application 722. And storage 730 includes a configuration 732 and one or more objects 734. The storage application 722 is a distributed application that stores, retrieves, and manages the objects 734. Further, the storage application 722 may replicate objects 734 across other nodes according to the configuration 732 specifying replication and fault tolerance policies. The storage application 722 further includes a placement component 724. The placement component 724 identifies a node location for an object 734 (e.g., for storage, retrieval, deletion, etc.) based on an object namespace. The object namespace may include a numerical namespace and a lexicographical namespace. The numerical namespace value for an object 734 specifies a location of an object based on the hash value of the identifier of the object 734. The lexicographical namespace value of the object specifies a location of an object based on a specified lexicographic identifier. In one embodiment, the placement component 724 determines placement based on whether a lexicographical namespace value is specified for a given object 734. The placement component 724 locates location-aware replicas based on the lexicographical namespace value. The placement component 724 locates secondary replicas (other than the location-aware replicas) based on the numerical namespace value.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, an authorized user may access the storage application 112 or related data available in the cloud. For example, the placement component 113 could execute on a computing system in the cloud and locate an object based on numerical and lexicographical namespace values. In such a case, the placement component 113 could determine a storage location and store objects in the identified node in the cloud. Doing so allows a user to access this information from any computing system attached to a network connected to the cloud (e.g., the Internet).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments presented herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments presented herein, other and further embodiments of the present disclosure may be devised without departing from the basic scope thereof, and the scope thereof is determined by the claims that follow.

What is claimed is:

1. A method for controlling object placement, comprising:
   receiving a first request to store a first object in an object store which includes a plurality of nodes, wherein the object store determines a placement of the first object in one of the plurality of nodes based on an object namespace, wherein the object namespace includes a numerical namespace and a lexicographical namespace, wherein each node is assigned a corresponding subspace of the object namespace for storing objects;
   upon determining that the first object specifies both a first numerical namespace value and a first lexicographical namespace value:
      generating a second object, wherein the second object is a replica of the first object;
      storing the first object in a first node of the plurality of nodes based on the first lexicographical namespace value, wherein the first lexicographical namespace value specifies the first node; and
      storing the second object in a second node of the plurality of nodes based on the first numerical namespace value;
   receiving a second request to store a third object in the object store; and
   upon determining that the third object specifies a second numerical namespace value and does not specify a lexicographical namespace value, storing the third object in a third node of the plurality of nodes based on the second numerical namespace value.

2. The method of claim 1, further comprising:
   receiving a third request to retrieve the first object;
   identifying a node storing the first object based on the first lexicographical namespace value; and
   retrieving the first object from the identified node.

3. The method of claim 2, wherein identifying the node storing the first object is further based on a result of a query of (i) a metadata container associated with the first object and (ii) a name of at least a replica of the first object.

4. The method of claim 1, further comprising:
   receiving a third request to delete the first object;
   identifying a node storing the first object based on the first lexicographical namespace value; and
   removing the first object from the identified node.

5. The method of claim 1, further comprising, prior to generating the second object:
   validating the first request using role-based authentication.

6. The method of claim 1, wherein storing the first object in the first node based on the first lexicographical namespace value comprises:
   upon determining that a metadata container associated with the first object includes metadata associated with a fourth object having a numerical namespace value that is identical to the first numerical namespace value of the first object, replacing the fourth object with the first object.

7. The method of claim 1, wherein the first numerical namespace value is generated by performing a hash function on the object.

8. A computer program product, comprising:
   a computer-readable storage medium having computer-readable program code embodied therewith, the computer-readable program code configured to perform an operation for controlling object placement, comprising:
      receiving a first request to store a first object in an object store which includes a plurality of nodes, wherein the object store determines a placement of the first object in one of the plurality of nodes based on an object namespace, wherein the object namespace includes a numerical namespace and a lexicographical namespace, wherein each node is assigned a corresponding subspace of the object namespace for storing objects;
      upon determining that the first object specifies both a first numerical namespace value and a first lexicographical namespace value:
         generating a second object, wherein the second object is a replica of the first object,
         storing the first object in the first node of the plurality of nodes based on the first lexicographical namespace value, wherein the first lexicographical namespace value specifies the first node, and
         storing the second object in a second node of the plurality of nodes based on the first numerical namespace value,
      receiving a second request to store a third object in the object store; and
      upon determining that the third object specifies a second numerical namespace value and does not specify a lexicographical namespace value, storing the third object in a third node of the plurality of nodes based on the second numerical namespace value.

9. The computer program product of claim 8, wherein the operation further comprises:
  receiving a third request to retrieve the first object;
  identifying a node storing the first object based on the first lexicographical namespace value; and
  retrieving the first object from the identified node.

10. The computer program product of claim 9, wherein identifying the node storing the first object is further based on a result of a query of (i) a metadata container associated with the first object and (ii) a name of at least a replica of the first object.

11. The computer program product of claim 8, wherein the operation further comprises:
  receiving a third request to delete the first object;
  identifying a node storing the first object based on the first lexicographical namespace value; and
  removing the first object from the identified node.

12. The computer program product of claim 8, wherein the operation further comprises, prior to generating the second object:
  validating the first request using role-based authentication.

13. The computer program product of claim 8, wherein storing the first object in the first node based on the first lexicographical namespace value comprises:
  upon determining that a metadata container associated with the first object includes metadata associated with a fourth object having a numerical namespace value that is identical to the first numerical namespace value of the first object, replacing the fourth object with the first object.

14. The computer program product of claim 8, wherein the first numerical namespace value is generated by performing a hash function on the object.

15. A system, comprising:
  a processor; and
  a memory storing a program, which, when executed on the processor, performs an operation for controlling object placement, the operation comprising:
    receiving a first request to store a first object in an object store which includes a plurality of nodes, wherein the object store determines a placement of the first object in one of the plurality of nodes based on an object namespace, wherein the object namespace includes a numerical namespace and a lexicographical namespace, wherein each node is assigned a corresponding subspace of the object namespace for storing objects;
    upon determining that the first object specifies both a first numerical namespace value and a first lexicographical namespace value:
      generating a second object, wherein the second object is a replica of the first object,
      storing the first object in a first node of the plurality of nodes based on the first lexicographical namespace value, wherein the first lexicographical namespace value specifies the first node, and
      storing the second object in a second node of the plurality of nodes based on the first numerical namespace value,
    receiving a second request to store a third object in the object store; and
    upon determining that the third object specifies a second numerical namespace value and does not specify a lexicographical namespace value, storing the third object in a third node of the plurality of nodes based on the second numerical namespace value.

16. The system of claim 15, wherein the operation further comprises:
  receiving a third request to retrieve the first object;
  identifying a node storing the first object based on the first lexicographical namespace value; and
  retrieving the first object from the identified node.

17. The system of claim 16, wherein identifying the node storing the first object is further based on a result of a query of (i) a metadata container associated with the first object and (ii) a name of at least a replica of the first object.

18. The system of claim 15, wherein the operation further comprises:
  receiving a third request to delete the first object;
  identifying a node storing the first object based on the first lexicographical namespace value; and
  removing the first object from the identified node.

19. The system of claim 15, wherein the operation further comprises, prior to generating the second object:
  validating the first request using role-based authentication.

20. The system of claim 15, wherein storing the first object in the first node based on the first lexicographical namespace value comprises:
  upon determining that a metadata container associated with the first object includes metadata associated with a fourth object having a numerical namespace value that is identical to the first numerical namespace value of the first object, replacing the fourth object with the first object.

* * * * *